(12) United States Patent
Rhee

(10) Patent No.: US 12,165,190 B2
(45) Date of Patent: Dec. 10, 2024

(54) IN-STORE NAVIGATION, ITEM IDENTIFICATION AND AUTOMATIC PURCHASE METHODS

(71) Applicant: INHA UNIVERSITY RESEARCH AND BUSINESS FOUNDATION, Incheon (KR)

(72) Inventor: Phill Kyu Rhee, Incheon (KR)

(73) Assignee: Inha University Research and Business Foundation, Incheon (KR)

(*) Notice: Subject to any disclaimer, the term of this patent is extended or adjusted under 35 U.S.C. 154(b) by 721 days.

(21) Appl. No.: 17/047,868

(22) PCT Filed: May 8, 2020

(86) PCT No.: PCT/KR2020/006103
§ 371 (c)(1),
(2) Date: Oct. 15, 2020

(87) PCT Pub. No.: WO2021/002587
PCT Pub. Date: Jan. 7, 2021

(65) Prior Publication Data
US 2023/0162267 A1    May 25, 2023

(30) Foreign Application Priority Data

Jul. 3, 2019 (KR) .................. 10-2019-0079754
Apr. 29, 2020 (KR) .................. 10-2020-0052170

(51) Int. Cl.
*G06Q 30/0601* (2023.01)
*G06V 20/50* (2022.01)
*G06V 40/20* (2022.01)

(52) U.S. Cl.
CPC ..... *G06Q 30/0633* (2013.01); *G06Q 30/0639* (2013.01); *G06V 20/50* (2022.01); *G06V 40/28* (2022.01)

(58) Field of Classification Search
CPC ........ G06Q 30/06–0645; G06Q 30/08; G06V 20/50; G06V 40/28; G16Y 10/00–90
See application file for complete search history.

(56) References Cited

U.S. PATENT DOCUMENTS

| | | |
|---|---|---|
| 10,176,456 B2 | 1/2019 | Puerini et al. |
| 2011/0029370 A1* | 2/2011 | Roeding ............ G06Q 30/0211 705/14.38 |

(Continued)

FOREIGN PATENT DOCUMENTS

| | | | |
|---|---|---|---|
| CN | 102713955 A * | 10/2012 | ............... G01S 5/02 |
| KR | 100988754 B1 | 10/2010 | |

(Continued)

*Primary Examiner* — Adam L Levine
(74) *Attorney, Agent, or Firm* — You & IP, LLC

(57) ABSTRACT

The present disclosure relates to an in-store automatic payment method and system applied to an unmanned store service, wherein the method and the system reduce the burden of excessively collecting videos from a number of fixed cameras installed in the related art by using an egocentric video, computer computation overhead, and installation expense and operating expense of a system for an unmanned store. The method includes: collecting, by a mobile terminal, an egocentric video; detecting, by at least one among multiple devices, a purchase target item from the egocentric video; calculating, by at least one among the multiple devices, a level of reliability for the purchase target item from the egocentric video; and registering, by at least one among the multiple devices, the purchase target item on a selected-item list of a user when the level of reliability is equal to or greater than a preset threshold.

11 Claims, 12 Drawing Sheets

(56) References Cited

U.S. PATENT DOCUMENTS

| | | | |
|---|---|---|---|
| 2020/0005385 A1* | 1/2020 | Stout | G06Q 30/0633 |
| 2020/0302510 A1* | 9/2020 | Chachek | G06Q 30/0639 |
| 2021/0090156 A1* | 3/2021 | Deveaux | H04W 4/80 |

FOREIGN PATENT DOCUMENTS

| | | | | |
|---|---|---|---|---|
| KR | 1020190093788 A | 8/2019 | | |
| WO | WO-2011014292 A1 * | 2/2011 | | G01S 5/02 |

\* cited by examiner

IN-STORE NAVIGATION, ITEM IDENTIFICATION AND AUTOMATIC PURCHASE METHODS

TECHNICAL FIELD

The present disclosure relates to an in-store automatic payment method, system, and program, and is a technology applied to an unmanned-store operation service that is offered even to the visually impaired.

BACKGROUND ART

Recently, global retailers have provided unmanned store services. Most retailers are still in the trial stage of operating small-scale unmanned stores. However, BingoBox of China has boldly commercialized unmanned stores and has conducted franchise business. BingoBox ran about 500 stores in 2018. In the case of Amazon.com, Inc. of the United State, it operates a system for an unmanned store called "Amazon Go" and has a plan to expand to 3000 stores by 2021. In Amazon Go, there are installed a total of 200 cameras in a 50-pyeong (one pyeong is equal to 3.3058 $m^2$) store and entering and existing of customers are managed using QR codes.

Amazon Go is typical of a system for an unmanned store, and the system enables a customer to purchase items in a store without staff. When a customer takes an item to purchase from a smart stand, the item is automatically identified. When the customer leaves the store with the item, an automatic payment is made.

FIG. 1 is a conceptual diagram illustrating a method of operating a conventional unmanned store such as Amazon Go.

As shown in FIG. 1, such an in-store automatic payment system is realized through about 200 cameras fixed on a camera truss 30 in the store. More specifically, when fixed cameras 31 to 36 installed in the store take images of a user and transmit the images to a cloud service server 10, the server 10 analyzes the images to identify the item that the user wants to purchase.

That is, in the payment system shown in FIG. 1, the accuracy of automatic payment for an item is closely related to the number of camera devices. As a result, a number of cameras need to be installed in the store, resulting in high installation expense and operating expense. In addition, in the current system for an unmanned store, the number of people who are allowed to enter the unmanned store is limited.

Recently, in South Korea, E-Mart 24 has provided an unmanned store service as a trial. However, since 39 cameras are installed in a 15-pyeong store, installation expense and operating expense are considerable, resulting in low efficiency.

In addition, the existing system for an unmanned store lacks consideration for the visually impaired or the elderly who have difficulty in finding their way. Therefore, in the system for an unmanned store, a technology for safely guiding the disadvantaged, for example, the visually impaired, to a location of an item is a necessary technology for the process of developing into a welfare state.

DOCUMENTS OF RELATED ART (Patent Document 1) Korean Patent No. 10-0988754
(Patent Document 2) Korean Patent Application Publication No. 10-2019-0093788
(Patent Document 3) U.S. patent Ser. No. 10/176,456

DISCLOSURE

Technical Problem

The present disclosure has been made keeping in mind the above problems occurring in the related art, and the present disclosure is directed to providing an in-store automatic payment method and system that reduce the burden of excessively collecting videos from a number of information input devices (for example, fixed cameras) installed in the related art by using an egocentric video, computer computation overhead, payment delay time, and installation expense and operating expense of a system for an unmanned store.

It is to be understood that technical problems to be solved by the present disclosure are not limited to the aforementioned technical problems and other technical problems which are not mentioned will be apparent from the following description to a person with an ordinary skill in the art.

Technical Solution

According to an embodiment of the present disclosure, an in-store automatic payment method is performed using a system including at least one among an information processing device, an information input device, an information output device, and a mobile terminal, the method including:

collecting, by the mobile terminal, an egocentric video;

detecting, by at least one among the multiple devices, a purchase target item from the egocentric video;

calculating, by at least one among the multiple devices, a level of reliability for the purchase target item from the egocentric video; and registering, by at least one among the multiple devices, the purchase target item on a selected-item list of a user when the level of reliability is equal to or greater than a preset threshold.

According to another embodiment of the present disclosure, there is provided an in-store automatic payment method of a system including at least one among multiple devices that are an information processing device, an information input device, an information output device, and a mobile terminal, the method including:

determining, by the information processing device, information on a purchase target item on the basis of the mobile terminal, a user application, or a unique ID of a user;

receiving, from the information processing device by the mobile terminal, an indoor map of a store and first location information about where the purchase target item is located on the map;

providing, by the information processing device, indoor navigation to the mobile terminal by using at least one among the multiple devices;

collecting, by the mobile terminal, an egocentric video;

detecting, by at least one among the multiple devices, the purchase target item from the egocentric video;

calculating, by at least one among the multiple devices, a level of reliability for the purchase target item from the egocentric video; and registering, by at least one among the multiple devices, the purchase target item on a selected-item list on the basis of the level of reliability.

According to an embodiment of the present disclosure, the calculating of the level of reliability for the purchase target item from the egocentric video may include:

providing, by the information processing device, device focus navigation to the mobile terminal so that the mobile terminal moves to a location where the level of reliability becomes optimized.

According to an embodiment of the present disclosure, the in-store automatic payment method may further include:

tracking, by the information processing device, a position of the user's hand from the collected video and determining whether the position of the user's hand is a preset position, wherein when the position of the user's hand is the preset position, the purchase target item is registered on the selected-item list, and the preset position is a distance where the user's hand easily picks up the item.

According to an embodiment of the present disclosure, the in-store automatic payment method may further include:

determining, by the information processing device, a purchase intention of the user by receiving the video taken by a fixed camera, wherein at the determining of the purchase intention of the user, the determining may be performed by recognizing, from the video, a state of the hand, a gesture of the hand, a state of a person, and a gesture of the person.

According to an embodiment of the present disclosure, the device focus navigation guides the mobile terminal to an optimum location for recognizing the purchase target item through reinforcement learning.

According to an embodiment of the present disclosure, the calculating of the level of reliability may further include:

applying, by at least one among the multiple devices, a collaborative filtering method and a rapid adaptive learning method of an object detector, thereby increasing reliability of object detection for the purchase target item.

According to an embodiment of the present disclosure, the providing of the device focus navigation may include:

receiving, by the information processing device or the mobile terminal, third location information of the mobile terminal on the basis of second location information of the item detected from the egocentric video; and providing, by the information processing device or the mobile terminal, the device focus navigation to the mobile terminal by comparing the third location information of the mobile terminal and the second location information of the item.

According to an embodiment of the present disclosure, the in-store automatic payment method may further include:

determining, by the information processing device, a purchase intention of the user by using the video collected from the information input device or the mobile terminal, wherein at the determining of the purchase intention of the user, the determining may be performed by recognizing, from the video, a state of the hand, a gesture of the hand, a state of a person, and a gesture of the person.

According to an embodiment of the present disclosure, the device focus navigation guides the mobile terminal to an optimum location for recognizing the purchase target item through an optimization algorithm such as reinforcement learning.

According to an embodiment of the present disclosure, the device focus navigation may be performed through an object detection algorithm and a reinforcement learning algorithm.

According to an embodiment of the present disclosure, an in-store automatic payment program is a program stored on a computer-readable recording medium in connection with a processor, wherein the processor performs a series of processes of an in-store automatic payment method according to an embodiment of the present disclosure.

Advantageous Effects

According to an embodiment of the present disclosure, the in-store automatic payment method and system can significantly reduce the number of information input devices, for example, fixed cameras, installed in the existing unmanned store.

Therefore, by significantly reducing the number of fixed cameras, the present disclosure can reduce the burden of excessively collecting videos, computer computation overhead, and payment delay time, and further significantly reduce installation expense and operating expense of a system for an unmanned store.

For example, "Amazon Go", which is the conventional system for an unmanned store, currently uses about 200 cameras. As a number of cameras are used, installation and operating costs are high. In addition, since complex computation is required, payment time is delayed about 10 to 15 minutes after the user leaves the store. In the related art, an existing system for an unmanned store using a small number of cameras cannot be fully automated.

However, according to an embodiment of the present disclosure, the in-store automatic payment method and system use a relatively fewer number of fixed cameras than "Amazon Go" does, but can provide a service of the same quality as the service provided in the related art.

Furthermore, according to an embodiment of the present disclosure, the in-store automatic payment method and system can help the disadvantaged, such as the visually impaired and the elderly, to easily purchase items in the store.

Effects that may be obtained from the present disclosure will not be limited to only the above described effects. In addition, other effects which are not described herein will become apparent to those skilled in the art from the following description.

MODE FOR INVENTION

Figure 1:
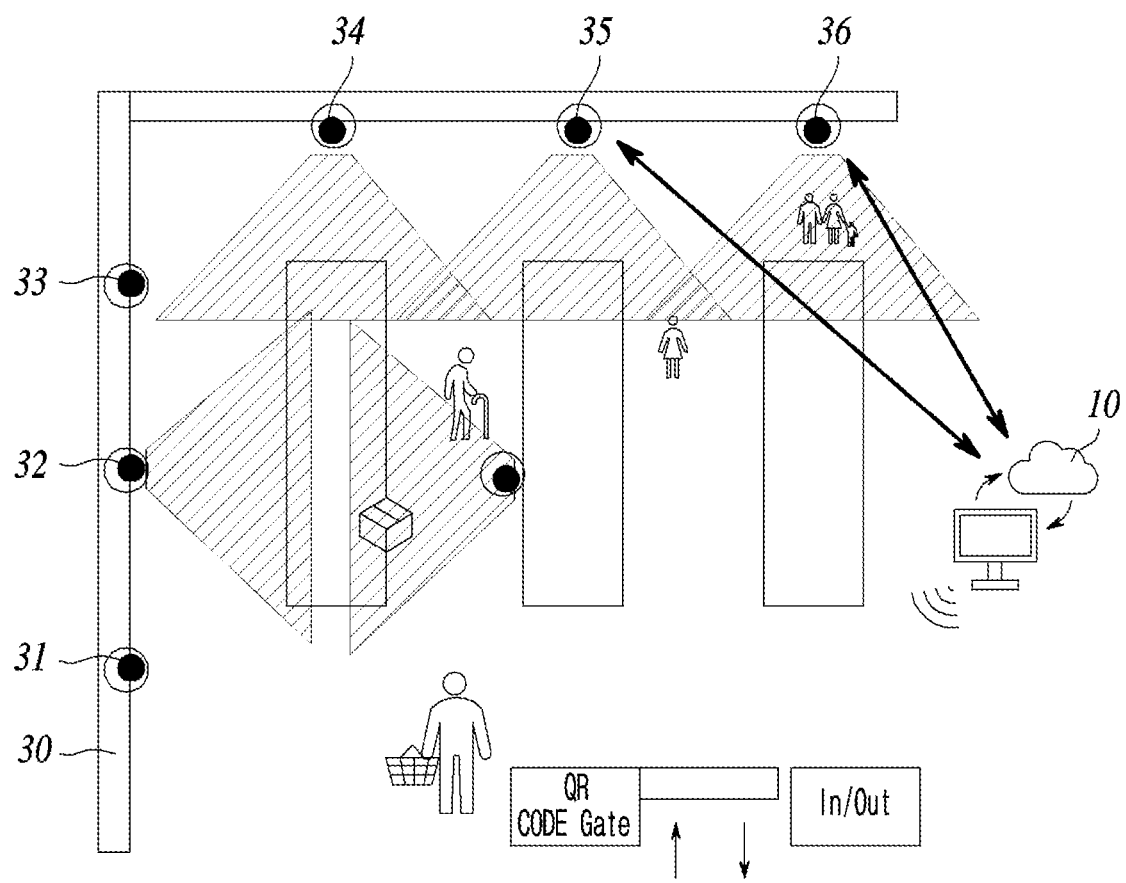
FIG. 1 is a conceptual diagram illustrating a method of operating a conventional unmanned store.

The present disclosure may be modified in various ways and implemented by various embodiments, so that specific embodiments will be described in detail with reference to the accompanying drawings. However, the present disclosure is not limited thereto, and the exemplary embodiments can be construed as including all modifications, equivalents, or substitutes in a technical concept and a technical scope of the present disclosure. The similar reference numerals refer to the similar elements described in the drawings.

Terms "first", "second", "A", "B", etc. used herein can be used to describe various elements, but the elements are not to be construed as being limited to the terms. The terms are only used to differentiate one element from other elements. For example, the "first" element may be named the "second" element without departing from the scope of the present disclosure, and the "second" element may also be similarly named the "first" element. The term "and/or" includes a combination of multiple related provided items or any one of them.

It will be understood that when an element is referred to as being "coupled" or "connected" to another element, it can be directly coupled or connected to the other element or intervening elements may be present therebetween. In contrast, it will be understood that when an element is referred to as being "directly coupled" or "directly connected" to another element, there are no intervening elements present.

The terms used in the present application are merely used to describe particular embodiments, and are not intended to limit the present disclosure. As used herein, the singular forms "a", "an", and "the" are intended to include the plural forms as well, unless the context clearly indicates otherwise. In the present application, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added.

In addition, the terms "first" and "second" are only used to distinguish between elements in the specification, and do not mean representing or predicting importance or priority in any way.

Unless otherwise defined, all terms including technical and scientific terms used herein have the same meaning as commonly understood by those skilled in the art to which the present disclosure belongs. It will be further understood that terms used herein should be interpreted as having a meaning that is consistent with their meaning in the context of this application and the relevant art and will not be interpreted in an idealized or overly formal sense unless expressly so defined herein.

Throughout the specification and claims, when a part "includes" an element, it is noted that it further includes other elements, but does not exclude other elements, unless specifically stated otherwise.

Throughout the specification, the term "egocentric" means "self-centered", which is a term usually used when modifying digital content. For example, an egocentric video refers to a first-person view video taken by a mobile terminal.

In addition, throughout the specification, the mobile terminal may refer to a device that a user carries, for example, a wearable device, such as a smart watch, or smart glasses; or a smart phone. Therefore, the egocentric video is a first-person view video taken by the mobile terminal, and refers to a video taken at the optimum location for recognizing an item that a user wants to purchase.

Throughout the specification of the present disclosure, the term "item" includes goods or products as well as service products or service marks. For example, the service products or the service marks refer to a beauty salon logo, and the like. Therefore, the present disclosure may be applied to the purchase of goods or products as well as to the store providing services.

Throughout the specification and the claims, the level of reliability is the level of reliability of detection and refers to the probability that an item is present within an area for the item detected by an object detection algorithm.

Throughout the specification and the claims, detection (object detection) is a computer technique related to computer vision and image processing. The detection refers to detection of semantic object instance (for example: humans, buildings, and vehicles) of a particular class from digital images and videos.

Throughout the specification and the claims, Expected Error Reduction (EER) refers to the query strategy of active learning that labels data points for reducing generalization error of a model.

Throughout the specification and the claims, an information processing device is a device that performs image information processing, item information processing, or the like on the taken video. Examples of the device may include, for example, a central server of a system. In the specification, the information processing device is described taking a central server as an embodiment thereof.

Throughout the specification and the claims, examples of an information input device may include a device, such as a camera, which receives external information. Examples of an information output device may include a voice signal device, a vibration device, a display, an LED, a haptic device, and the like. In the specification, the information input device is described taking a camera as an embodiment thereof.

Hereinafter, exemplary embodiments of the present disclosure will be described in detail with reference to the accompanying drawings.

Figure 2:
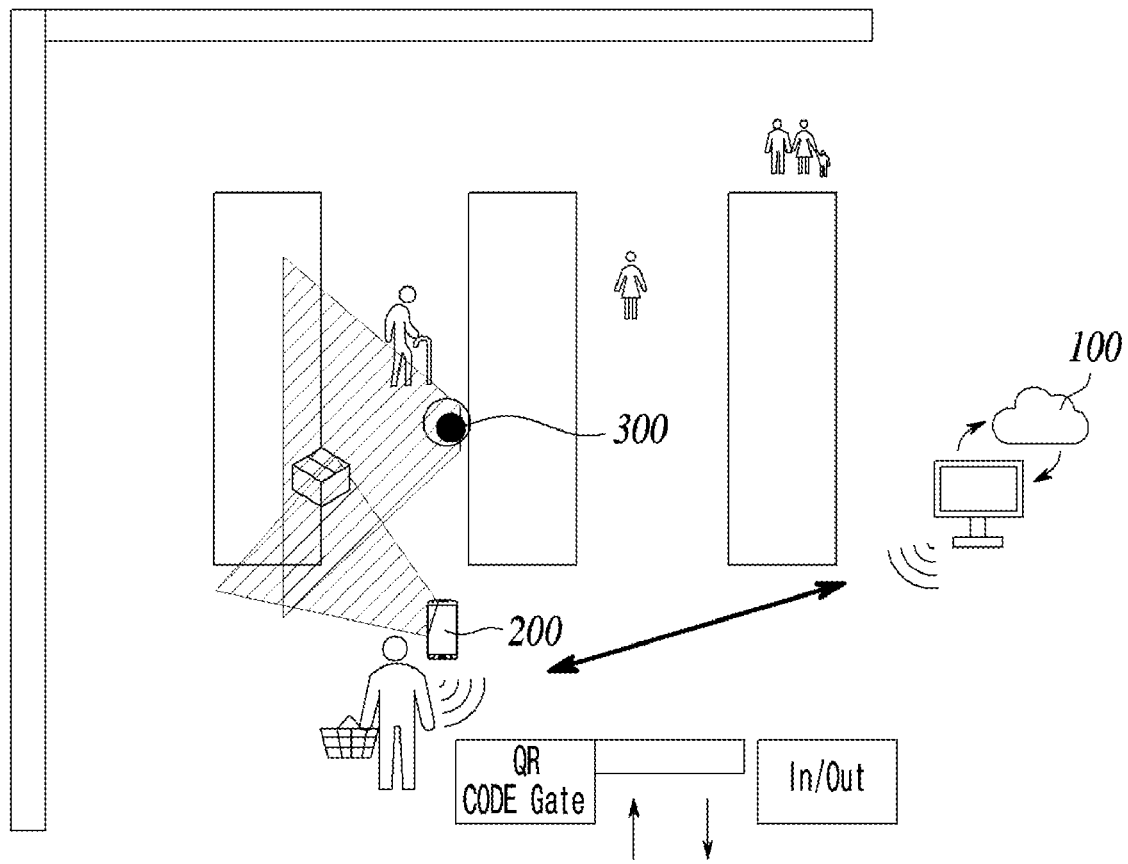
FIG. 2 is a diagram illustrating an environment where an in-store automatic payment method and system according to an embodiment of the present disclosure are used.
Figure 3:
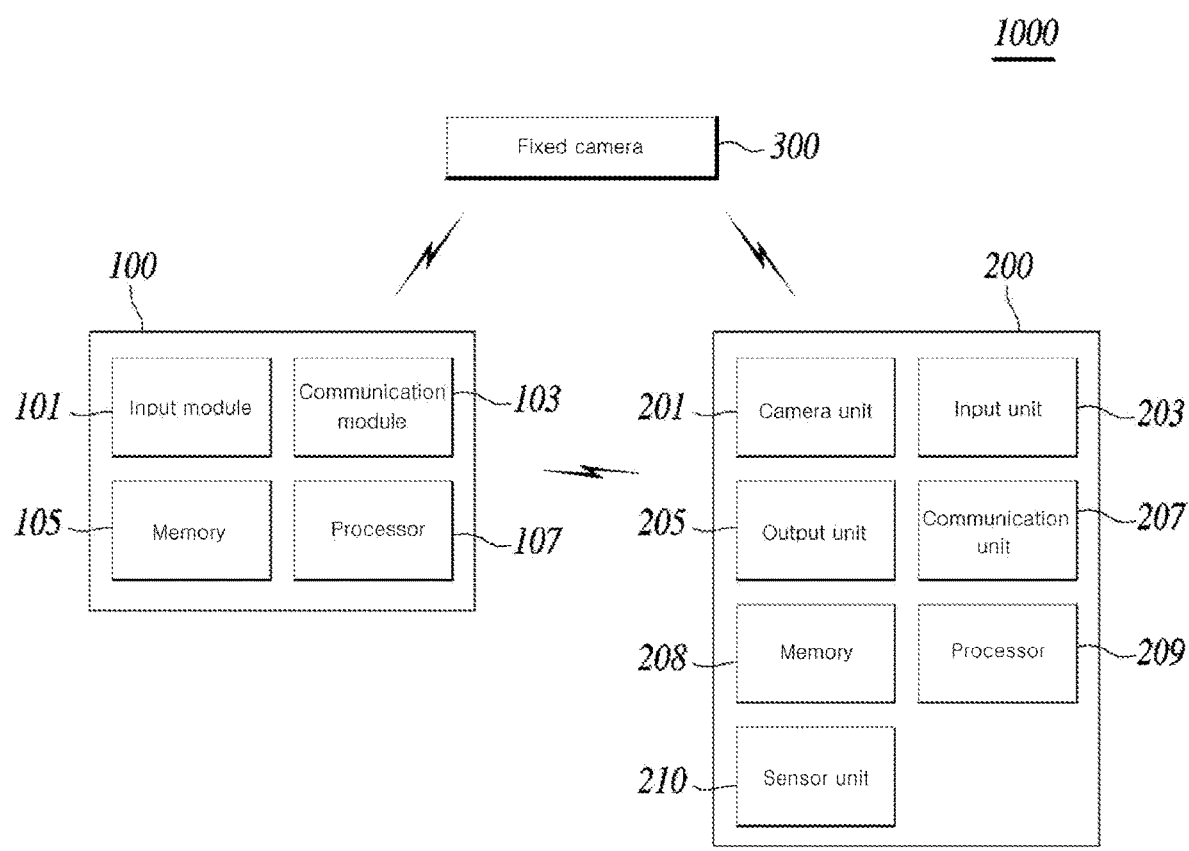
FIG. 3 is a block diagram illustrating an in-store automatic payment system according to an embodiment of the present disclosure.

FIG. 2 is a diagram illustrating an environment where an in-store automatic payment method and system according to an embodiment of the present disclosure are used. FIG. 3 is a block diagram illustrating an in-store automatic payment system according to an embodiment of the present disclosure.

Referring to FIGS. 2 and 3, according to an embodiment of the present disclosure, the in-store automatic payment system may include a central server 100, a mobile terminal 200, and a fixed camera 300. In the unmanned store environment shown in FIG. 2, the multiple fixed cameras 300 are installed at respective stands, a user carries the mobile terminal 200, and one central server 100 is installed to receive videos from the multiple fixed cameras 300, to receive an egocentric video and user information from the mobile terminal 200, and to transmit navigation information to the mobile terminal 200.

According to an embodiment of the present disclosure, the in-store automatic payment method and system implement an egocentric environment by using the mobile terminal 200 of the user, so that the accurate intention of the user is transmitted to the central server 100.

That is, according to an embodiment of the present disclosure, the method and the system enables accurate action and object recognition through an egocentric video that is focused on the first person, namely, the user, so that the accurate purchase intention of the user in the unmanned store is transmitted to the central server 100.

As shown in FIG. 1, since the cameras 31 to 36 installed in the existing unmanned store are fixed to the truss 30, the area that the cameras cover is limited. However, in the egocentric payment environment according to an embodiment of the present disclosure as shown in FIG. 2, the mobile terminal 200 moves as the user moves in person in the store and the mobile terminal 200 takes an egocentric video. Therefore, the number of cameras required in a system for an unmanned store and payment delay time are significantly reduced, compared to the related art.

In the meantime, according to an embodiment of the present disclosure, the in-store automatic payment system may further include a data input device when necessary. For example, a weight sensor, an infrared sensor, a touch sensor, or the like may be further installed in order to reinforce a means for recognizing items or for finding the optimum location to take an egocentric video.

According to an embodiment of the present disclosure, the in-store automatic payment system includes the central server 100, the mobile terminal 200, and the fixed camera 300. The central server 100 is in charge of overall operation of the in-store automatic payment system, and supports automatic payment for the item that the user wants to purchase in the store.

According to the embodiment of the present disclosure, the mobile terminal 200 provides the user with a travel path and device focus navigation in the store, and takes an egocentric video. The providing of the travel path is a kind of an indoor navigation service, and the device focus navigation refers to a service that guides the mobile terminal of the user to an exact point on the shelf at which the item that the user wants to purchase is located.

Device focus navigation according to an embodiment of the present disclosure will be described later with reference to FIGS. 6 to 9.

According to an embodiment of the present disclosure, the mobile terminal 200 may be a portable communication device, such as a smart phone that the user carries, or the like; a computer; a portable multimedia device; a portable medical device; a camera; or a wearable device, such as a smart watch, Google Glass, or the like. In addition, the mobile terminal 200 may be a terminal that the unmanned store provides to the user, particularly, at the entrance of the store.

According to an embodiment of the present disclosure, the mobile terminal 200 receives information from the central server 100 through a program in the form of an application installed on the terminal, so as to provide a travel path to the user. In addition, the mobile terminal 200 guides the user to in front of a smart stand where an item to be purchased is located, and provides the device focus navigation to the user.

According to an embodiment of the present disclosure, the fixed camera 300 is installed in the store and takes an in-store video. According to an embodiment of the present disclosure, the number of fixed cameras is considerably smaller than that of Amazon Go, which requires about 200 fixed cameras, so that fixed costs and operating expense are greatly reduced. According to an embodiment of the present disclosure, closed-circuit television (CCTV) may be used as the fixed camera 300. The fixed camera 300 includes a lens, an image sensor, an image signal processor, or a flash. When the user takes an item to purchase from the smart stand, the purchase intention of the user is determined using information provided from the fixed camera 300, and according to the determined purchase intention, the item is put on a selected-item list for the user.

A detailed configuration of an in-store automatic payment system according to an embodiment of the present disclosure will be described with reference to FIG. 3.

The block diagram of FIG. 3 is for illustrating an in-store automatic payment system 1000, and the present disclosure is not limited thereto. Therefore, the in-store automatic payment system 1000 may be changed into other forms.

As shown in FIG. 3, the central server 100 may include an input module 101, a communication module 103, a memory 105, and a processor 107. In addition, the central server 100 may further include other components. Hereinafter, each of the components included in the central server 100 will be described in more detail.

The input module 101 may input commands or data used for other components included in the central server 100. The input module 101 may include an input part, a sensor part, and an interface part. As the input part, a microphone, a mouse, or a keyboard is used. An operator may directly input commands or data to the input module 101 through the input part. The sensor part generates data by sensing an ambient environment. The interface part receives video data from the fixed camera 300 through interaction with the fixed camera 300. The interface part may receive data from the fixed camera 300 by using communication technology, for example, Bluetooth, Bluetooth Low Energy (BLE), Near Field Communication (NFC), WLAN, Zigbee, Infrared Data Association (IrDA), Wi-Fi Direct (WFD), ultra-wideband (UWB), Wi-Fi, Radio-Frequency Identification (RFID), or the like.

In the meantime, the communication module 103 performs communication with the central server 100 and an external device (not shown). The communication module 103 generates a communication channel between the central server 100 and the external device. As a result, the central server 100 may communicate with the external device through the communication channel. The communication module 103 performs wired communication or wireless communication or both. In the case where the communication module 103 performs wireless communication, communication with the external device is performed through a wide area network or a local area network.

The memory 105 functions as a distributed-data input part. That is, the memory 105 stores in-store map information and data including a video acquired from the fixed camera 300 or the mobile terminal 200. In addition, the memory 105 stores an in-store automatic payment program according to an embodiment of the present disclosure. In addition, the memory 105 may store data input from a mobile camera, a weight sensor, a touch sensor, an infrared sensor, or the like. As the memory 105, a volatile memory or a non-volatile memory is used. An in-store arrangement plan is stored using the memory 105 and is used for guiding the user to an item.

The processor 107 executes an in-store automatic payment program stored in the memory 105 according to an embodiment of the present disclosure. According to the execution of the program, the components included in the central server 100 are controlled, and data processing or operation is performed. In addition, the processor 107 is connected to the fixed camera 300 through the input module 101. The processor 107 may communicate with the mobile terminal 200 in the store through the communication module 103. The processor 107 selects, on the basis of the in-store map in the memory 105, a travel path to a destination in the store for the mobile terminal 200, that is, to a stand where an item that the user wants to purchase is located. In addition, the processor 107 provides the mobile terminal 200 with map information based on the travel path. When the user comes to the stand where the item is located, the processor 107 provides the device focus navigation to the user. The processor 107 acquires an in-store video by using the fixed camera 300, and monitors the video to detect an obstacle on the travel path of the mobile terminal 200. Since there are various items and other users in the store, many obstacles are present. Therefore, in order to safely guide the user looking at only the mobile terminal 200 to the point at which the item to purchase is located, the processor 107 provides information on the obstacles through the mobile terminal 200.

In addition, according to an embodiment of the present disclosure, the mobile terminal 200 includes a camera unit 201, an input unit 203, an output unit 205, a communication unit 207, a memory 208, and a processor 209. In addition, the mobile terminal 200 may further include other components. Hereinafter, each of the components included in the mobile terminal 200 will be described in more detail.

Using the camera unit 201, the user takes a video of surroundings while moving. To this end, the camera unit 201 includes a lens, an image sensor, an image signal processor, or a flash. The camera unit 201 may be used in a form that is worn on the user's body. As the camera unit 201, an egocentric camera is used. The egocentric camera replaces multiple fixed cameras, so that the number of fixed cameras used is greatly reduced. Since the fixed camera 300 is fixed in the store, the coverage area is limited and a blind area is present. However, in an egocentric environment, the mobile terminal 200 including the camera unit 201 and the sensor unit 210 moves as the user moves, so that the blind area is reduced, the purchase intention of the user is more accurately determined through action recognition, and theft is prevented. In addition, in the egocentric environment, a purchase pattern of the user is analyzed through action data collected by the mobile terminal 200, so that an accurate preferred item is recommended. The in-store automatic payment system uses an Active Semi-Supervised Learning (ASSL) algorithm technique, so that the operating cost is minimized compared to the other techniques.

Through the input unit 203, commands or data to be used in the mobile terminal 200 are input. The input unit 203 may input commands or data used for components other than the input unit 203 which are included in the mobile terminal 200. As the input unit 203, a microphone, a mouse, or a keyboard is used. An operator may directly input commands or data through the input unit 203. The input unit 203 may be a microphone, a keyboard, or a keypad.

The output unit 205 provides information to the outside of the mobile terminal 200. The output unit 205 includes a display part or an audio part. The display part provides information visually. The display part may be a display as an example. The audio part provides information audibly. The display part may be a touch circuit set to sense the touch, or may be a sensor circuit set to measure the strength of the force generated by the touch.

The mobile terminal 200 may transmit and receive operation commands or data from an external device (not shown), such as the central server 100, or the like, through the communication unit 207. The communication unit 207 forms a communication channel between the mobile terminal 200 and an external device. The communication unit 207 is connected to the memory 205 or the processor 209. The communication unit 207 may perform wired or wireless communication. Wireless communication may use a wide area network or a local area network.

The memory 208 may store various types of data used for each of the components of the mobile terminal 200. For example, the memory 208 may store the in-store map information, or an in-store automatic payment program in the form of an application. The memory 208 may be a volatile memory or a non-volatile memory.

The processor 209 executes a program stored in the memory 208. The processor 209 may control the components included in the mobile terminal 200, may process data, or may perform operations. The processor 209 communicates with the central server 100 through the communication unit 207 within the store. The processor 209 may acquire the travel path to the purchase item and map information corresponding thereto through the central server 100. In addition, the processor 209 may provide an in-store navigation service and a device focus navigation service by using the travel path and the map information. The processor 209 provides a user interface (UI) related to the in-store navigation service through the output unit 205. The processor 209 provides the in-store navigation service and simultaneously monitors the video taken by the camera unit 201, so that the processor 209 detects an obstacle on the travel path, and creates an alarm about the obstacle through the output unit 205.

Figure 4:
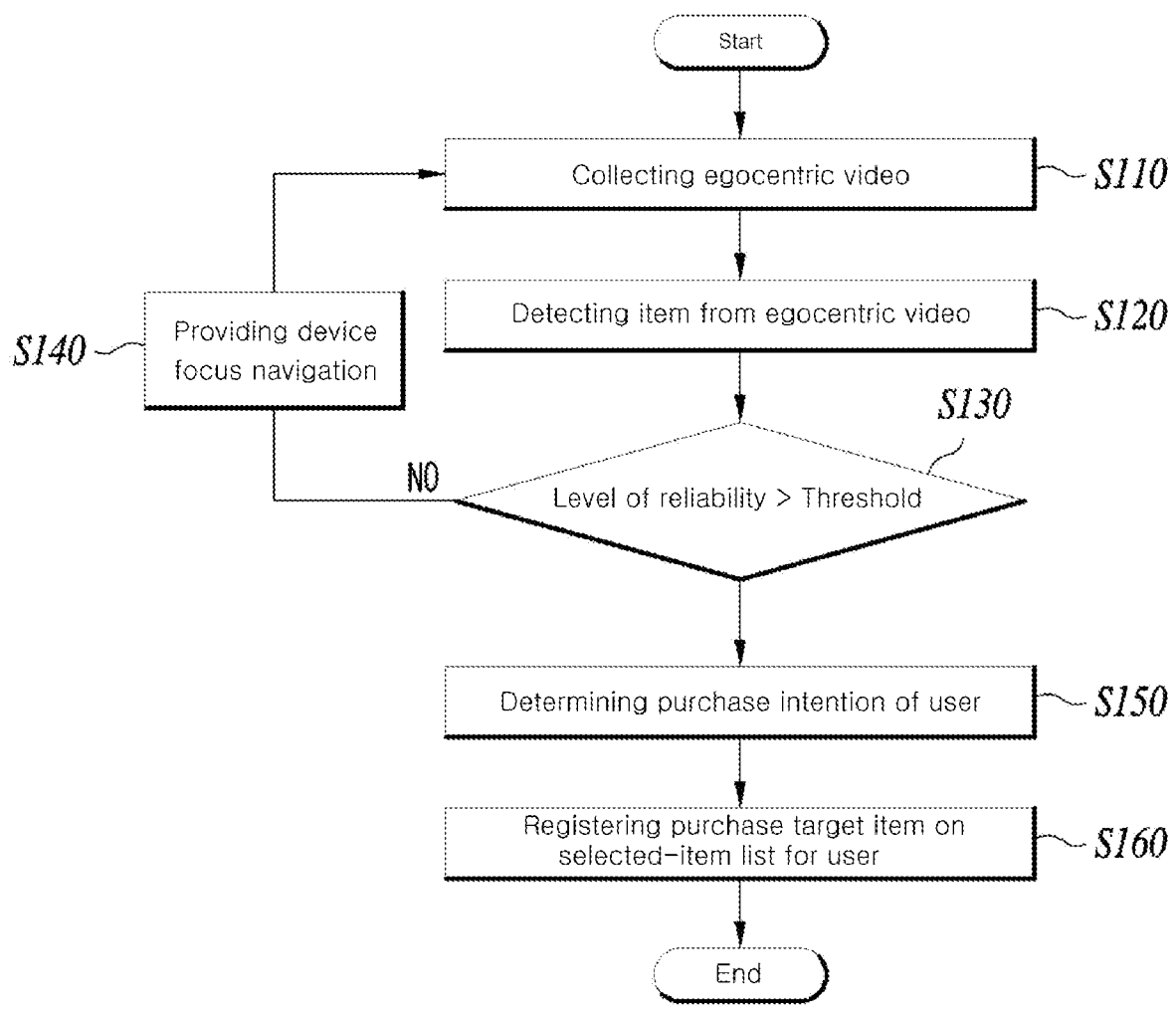
FIG. 4 is a flowchart illustrating an in-store automatic payment method according to an embodiment of the present disclosure.

FIG. 4 is a flowchart illustrating an in-store automatic payment method according to an embodiment of the present disclosure.

In the in-store automatic payment method according to an embodiment of the present disclosure, an egocentric video is taken using the mobile terminal that the user carries while moving in the store, an item is detected and recognized from the egocentric video, and the mobile terminal is guided to a location at which the optimum level of reliability is calculated, thereby registering the item on the selected-item list.

Referring to FIG. 4, according to an embodiment of the present disclosure, an in-store automatic payment method includes: collecting an egocentric video by the mobile terminal at step S110; detecting a purchase target item from the egocentric video at step S120; calculating whether the predicted level of reliability exceeds a preset threshold at step S130; providing, when the level of reliability is lower than the threshold, the device focus navigation to move the mobile terminal to a location at which the level of reliability becomes optimized, at step S140; determining the purchase intention of the user at step S150; and registering, when the level of reliability is equal to or greater than the threshold and the purchase intention is determined, the item on the selected-item list for the user at step S160. In this case, the mobile terminal may inform the user through the information output device so that the user recognizes the registration of the item on the selected-item list. Examples of the information output device may include a voice device, a signal device, a vibration device, a display, an LED, and a haptic device.

In the meantime, the step S130 of calculating whether the predicted level of reliability exceeds the preset threshold may further include, in the case where the mobile terminal collecting the video is a wearable device, tracking the position of the user's hand and determining whether the user's hand is positioned at a distance where the item is easily picked up.

In the case where the user is at the shelf on which the item is placed and the user takes an egocentric video using the mobile terminal, guiding the location of the mobile terminal to the location at which the level of reliability for the item becomes optimized is referred to as device focus navigation according to an embodiment of the present disclosure.

In the case where the mobile terminal is a smartphone, the user holds the smartphone by hand. In this case, the device focus navigation may be referred to as hand navigation.

According to an embodiment of the present disclosure, the in-store automatic payment system and method that provide the device focus navigation significantly reduce the number of fixed cameras, compared to the conventional system for an unmanned store. There is high likelihood that an item is not recognized well because the quality of the acquired image of the item is poor. In order to compensate for this problem, "Amazon Go" in the related art has installed hundreds of fixed cameras on the ceiling to increase the accuracy of recognizing an item.

However, the present disclosure guides the mobile terminal that the user carries to the location at which the level of reliability for the item becomes optimized, thereby improving the quality of the image of the item to be purchased. Therefore, according to the present disclosure, since an item is detected through the mobile terminal that the user carries, there is no need to install numerous fixed cameras in a store, whereby the installation expense and the maintenance cost for the system for an unmanned store are significantly reduced. In addition, since the amount of the video and sensor information to be processed is reduced, the present disclosure can significantly reduce the payment delay time, compared to the conventional method. The present disclosure is provided as an easy tool for the disadvantaged, for example, the perception-impaired, the elderly with poor perception, or the like, to select an item.

The device focus navigation according to an embodiment of the present disclosure will be described later with reference to FIGS. 6 to 9.

Figure 5:
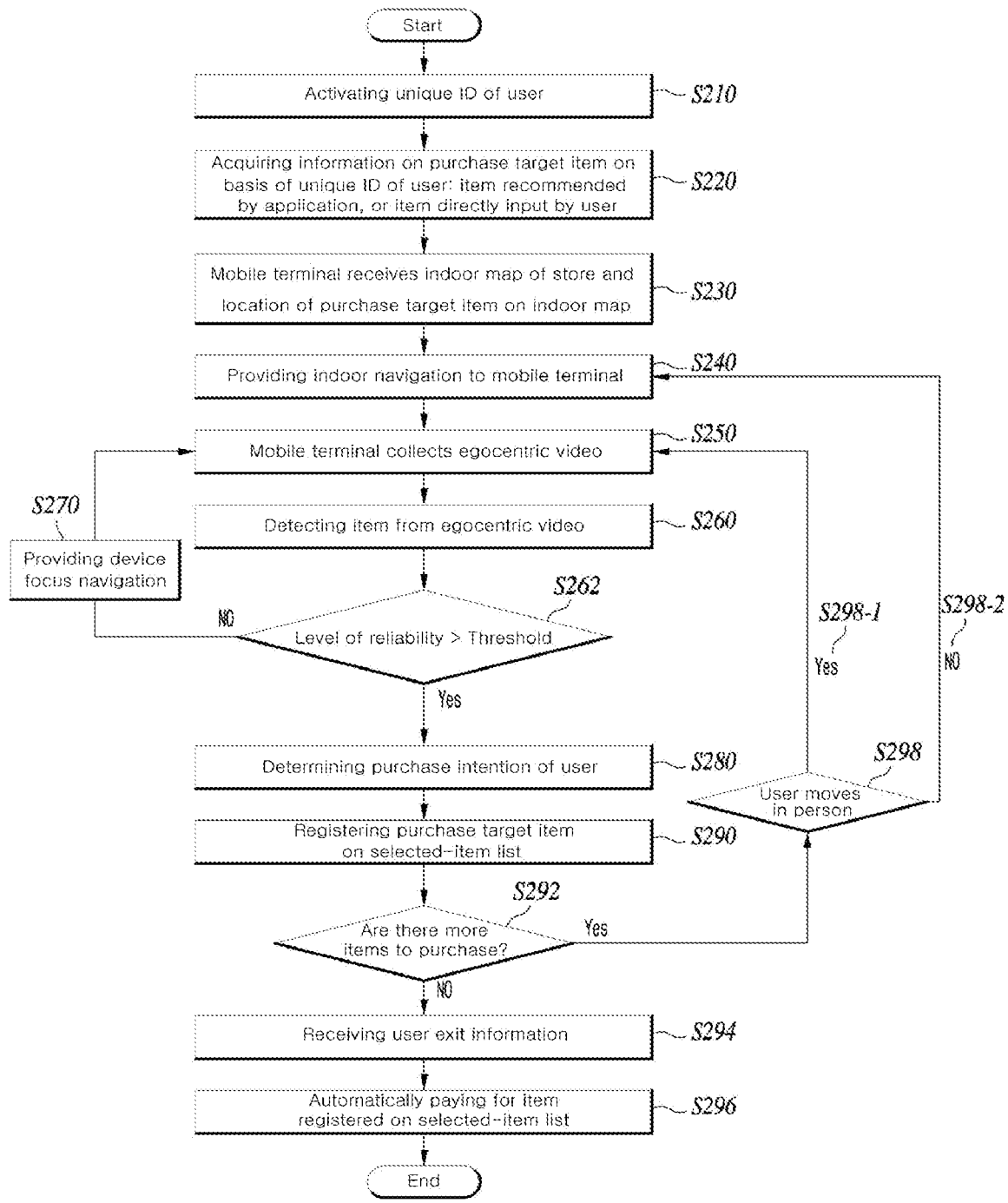
FIG. 5 is a flowchart illustrating an in-store automatic payment method according to another embodiment of the present disclosure.

FIG. 5 is a flowchart illustrating an in-store automatic payment method according to another embodiment of the present disclosure.

The embodiment described above with reference to FIG. 4 is an embodiment where the user personally moves to the shelf to purchase the item. In FIG. 5, an embodiment of purchasing an item recommended by an application or an item that is selected by the user through an application in advance will be described.

The overall sequence of the in-store automatic payment method according to the embodiment shown in FIG. 5 may include the following steps.

First, when the user passes the store entrance, a unique ID of the user is activated through the mobile terminal of the user at step S210. The unique ID of the user may be recorded on an application installed on the mobile terminal. That is, according to the present disclosure, the system recognizes a unique identifier allocated to the user when the user enters the unmanned store.

Then, the central server according to an embodiment of the present disclosure acquires, on the basis of the unique ID, information on a purchase target item at step S220. The purchase target item may be an item recommended by an application on the basis of the unique ID of the user, or may be an item that is directly input by the user and stored in a wish list, or the like.

Then, the mobile terminal receives an indoor map of the store from the central server and receives first location information of the purchase target item and a travel path thereto on the indoor map at step S230.

According to an embodiment of the present disclosure, the first location information may include the following information on the indoor map of the store: the stand number where the purchase target item is located, the shelf number of the stand, the section number of the stand, or the like.

According to the present disclosure, the system may provide indoor navigation to the mobile terminal at step S240. According to an embodiment of the present disclosure, the indoor navigation is a service that informs the user of the travel path through the mobile terminal so that the user follows the travel path to a first location of the purchase target item. The service may be displayed on a screen, or for the visually impaired may be output into voices, vibrations, haptic outputs, signals, or the like that the visually impaired can recognize.

According to an embodiment of the present disclosure, the indoor navigation may inform the user of an obstacle on the travel path. Therefore, the user is able to avoid an obstacle while following the travel path to the first location at which the purchase target item is located. For example, the obstacles may be other users or stacked items. Since the user moves only looking at the terminal on which the indoor navigation is displayed, the user may easily collide with the obstacles. Therefore, it is necessary to avoid the obstacles by interaction between the central server and the terminal of the user.

The central server acquires an in-store video through the fixed camera installed in the store and detects an obstacle from the video. When the central server determines the travel path at the previous step S230, an obstacle may not be present on the travel path and may travel to the current location on the travel path. Even in this case, the processor of the central server detects the obstacle on the travel path.

In the meantime, also the mobile terminal that the user carries detects an obstacle at the step S240 of providing the indoor navigation. That is, while providing the in-store navigation service, the mobile terminal monitors the travel path through the camera unit 201 (shown in FIG. 3) to detect an obstacle. When the mobile terminal detects an obstacle, the mobile terminal displays a warning at the step S240 of providing the indoor navigation. After displaying the warning, when the relevant action is taken, the mobile terminal takes the in-store video again. Due to the effective interactive process between the central server and the mobile terminal, the user is prevented from colliding with an obstacle.

According to an embodiment of the present disclosure, the indoor navigation detects obstacles, for example, other users in the store, and predicts and warns about a risk of a collision. In addition, the indoor navigation reduces the number of fixed cameras installed in the store by actively using the mobile terminal. Users shopping in the store are likely to collide with each other because the users move only looking at their mobile terminals. Therefore, obstacles, for example, other users are displayed through the mobile terminal so as to warn about the risk of a collision to prevent the risk. In particular, the indoor navigation may help people having difficulty in finding travel paths, such as the disabled or the elderly.

When the user reaches the place at which the item is located according to the indoor navigation, the user takes an egocentric video using the mobile terminal at step S250. According to an embodiment of the present disclosure, the egocentric video refers to a video of the item located on the stand, wherein the video taken using the mobile terminal of the user.

According to an embodiment of the present disclosure, the system detects the item from the taken egocentric video at step S260, and determines whether the level of reliability for the item in the image is equal to or greater than a threshold at step S262. In the meantime, the step S262 of determining whether the predicted level of reliability exceeds the preset threshold may further include, in the case where the mobile terminal collecting the video is a wearable device, tracking the position of the user's hand and determining whether the user's hand is positioned at a distance where the item is easily picked up.

According to an embodiment of the present disclosure, when the level of reliability is lower than the threshold, the system provides the device focus navigation at step S270 so that the mobile terminal moves to a location where the level of reliability becomes optimized. When the level of reliability is equal to or greater than the threshold, the system determines the purchase intention of the user at step S280 and registers the item on the selected-item list for the user at step S290.

According to an embodiment of the present disclosure, the system identifies whether there are more items that the user wants to purchase at step S292. When there are more items to purchase, proceeding back to the step S240 of providing the indoor navigation or the step S250 of taking the egocentric video takes place to perform the above-described steps again.

When the user moves to the stand in person at step S298 and immediately determines an item to purchase at step S298-1, the above-described steps in FIG. 4 are performed, starting from the step S250 of taking the egocentric video. When the user further purchases an item on a recommended list or a wish list on the application at step S298-2, the above-described steps in FIG. 5 are performed, starting from the step S240 of providing the indoor navigation.

In the meantime, according to an embodiment of the present disclosure, the steps S280 and S290 of determining the purchase intention of the user and registering the item on the selected-item list for the user may further include the following processes.

Multiple distributed-data input devices, such as a weight sensor, an infrared sensor, a touch sensor, or the like, use the collected data to detect that the user enters an article registration conversion area. The article registration conversion area refers to an area where the item selected by the user from the stand is deleted from a displayed-article list for the stand and is registered on the selected-item list for the user. The item registration conversion area may be up to a predetermined distance in front of the stand.

In addition, when the user's action to pick up the item is recognized by using the data received from the fixed camera, the camera unit of the mobile terminal, the weight sensor, the touch sensor, or the infrared sensors, the item is registered on the selected-item list and is deleted from the displayed-article list for the stand. In the meantime, the method of registering the item on the selected-item list for the user may further include showing, when the user selects an image taken by the mobile terminal, detailed information of the detected item to the user and registering the item on the selected-item list after the user checks whether the item is correct.

In addition, according to an embodiment of the present disclosure, receiving user exit information at step S294 and automatically paying for the item registered on a shopping cart at step S296 may include the following processes.

The central server uses at least one distributed-data input device to detect that the user finishes shopping in the store and arrives at an unmanned counter area. In addition, the central server recognizes features, such as the weight, shape, color, texture, or size of the item in the unmanned counter area.

The central server compares the recognized feature information with information on the item registered on the selected-item list for the user ID. When the recognized feature information and the information on the item are the same, the item registered on the selected-item list is automatically paid.

Figure 6A:
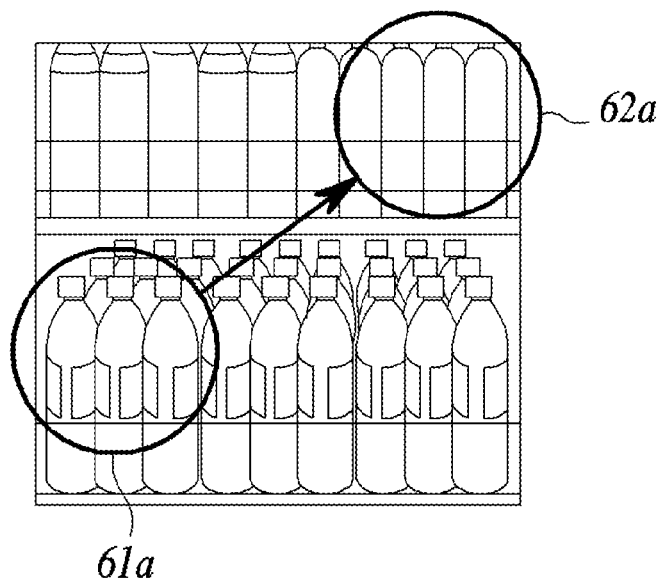
FIG. 6A and FIG. 6B are, respectively, a conceptual diagram illustrating device focus navigation according to an embodiment of the present disclosure.
Figure 6B:
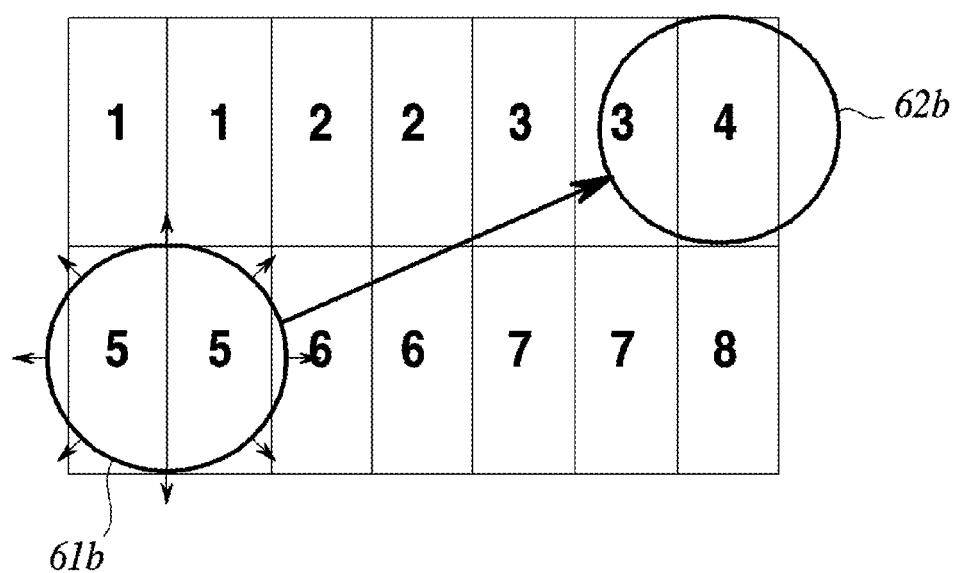

FIG. 6 is a conceptual diagram illustrating device focus navigation according to an embodiment of the present disclosure. The providing of the device focus navigation may include acquiring, by the processor of the central server or mobile terminal, location coordinates (referred to as second location information) in the video of the item detected from the egocentric video, and acquiring, on the basis of information on the location coordinates, information on location coordinates (referred to as third location information) of the mobile terminal in the video.

The providing of the device focus navigation may also include comparing, by the processor of the central server or mobile terminal, the third location information of the mobile terminal and the second location information of the item so as to provide the mobile terminal with the device focus navigation.

According to an embodiment of the present disclosure, the device focus navigation guides the user to move the mobile terminal left and right/up and down/at an angle, or the like so as to lead accurately to the location of the purchase target item on the display stand where the item is placed. That is, the device focus navigation means guiding the camera unit of the mobile terminal to be located at a distance where the purchase target item is detected with the optimum level of reliability and the user's hand easily picks up the purchase target item.

Referring to FIG. 6, a method of providing the device focus navigation by using the taken egocentric video will be described.

When the user takes an egocentric video (a) towards the shelf of the actual stand, information (b) in the form of a map showing the shelf and the location of the item in detail is displayed on the mobile terminal.

In the actual stand (a), the location 61a of the user and the location 62a of the purchase target item are spaced apart from each other. In the device focus navigation according to an embodiment of the present disclosure, the processor analyzes the egocentric video and calculates the location 62b of the purchase target item and the location 61b of the camera unit on the stand map (b). On the stand map (b), the location 61b of the camera unit is identified using the location of the item recognized in front of the camera unit, and refers to the location of the user.

The processor compares and matches the location of the item recognized in front of the camera unit and the location of the item displayed on the stand map (b). For example, when a yellow beverage on the actual stand (a) is captured by the camera unit, the processor matches the yellow beverage and the item displayed on the stand map (b). As a result, it is found that the current location of the camera unit is in front of number 5 (61b), and information on the location 61b of the user is calculated.

The processor may use a value of the calculated information on the location of the user to calculate a direction and a distance in which the camera unit needs to move to the location 62b of the purchase target item, and may provide the direction and the distance to the user. For example, moving up, down, left, right, in diagonal directions, or the like may be provided, and a moving distance may be provided by calculating the ratio between the distance on the map and the actual distance.

When the camera unit moves to the derived location according to the device focus navigation, the processor of the central server or mobile terminal takes the egocentric video again to calculate the level of reliability.

When the level of reliability is equal to or less than the threshold, the processor performs the device focus navigation again. When the level of reliability exceeds the preset threshold, the item is added to the selected-item list.

Figure 7:
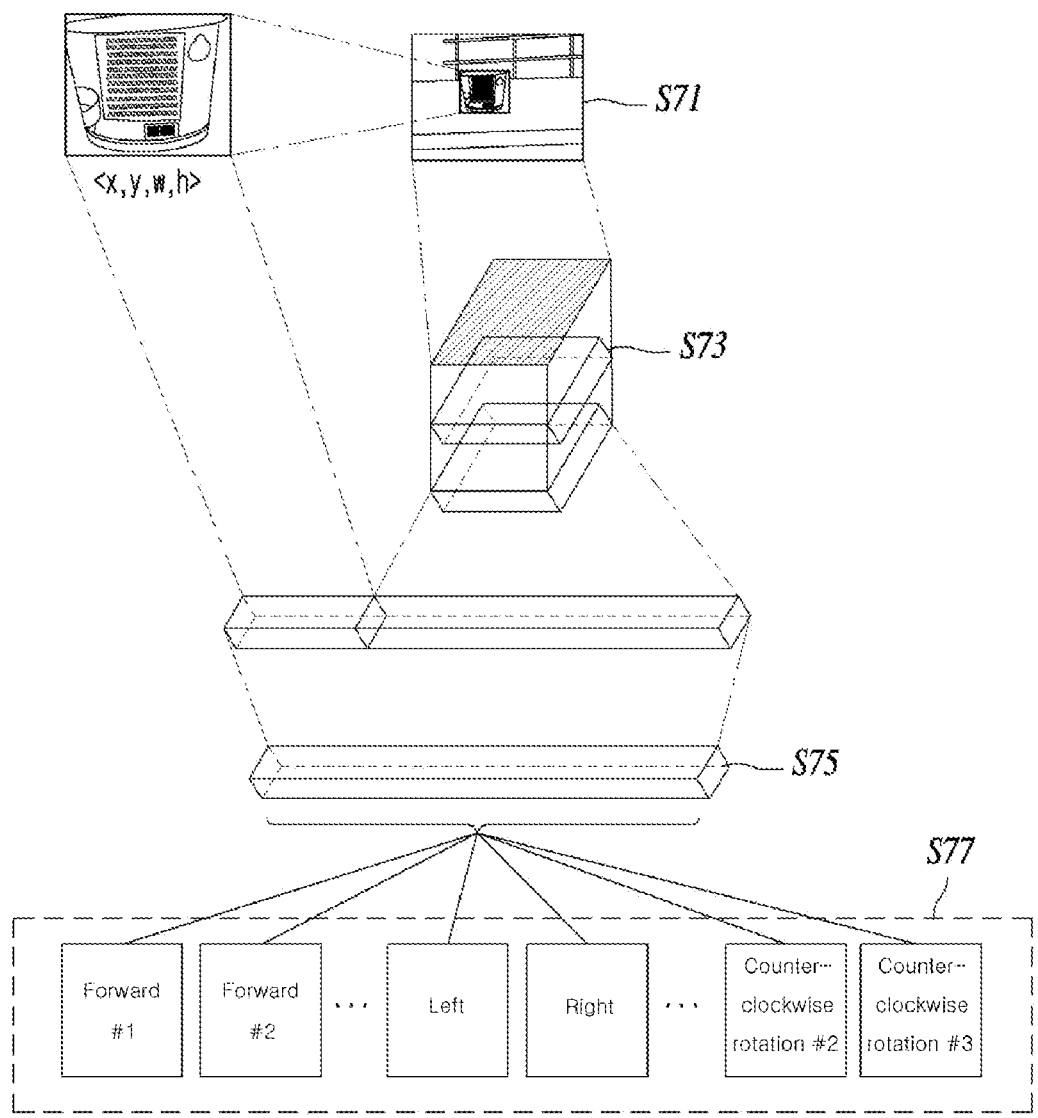
FIG. 7 is a diagram illustrating a learning network for performing device focus navigation according to an embodiment of the present disclosure.
Figure 8:
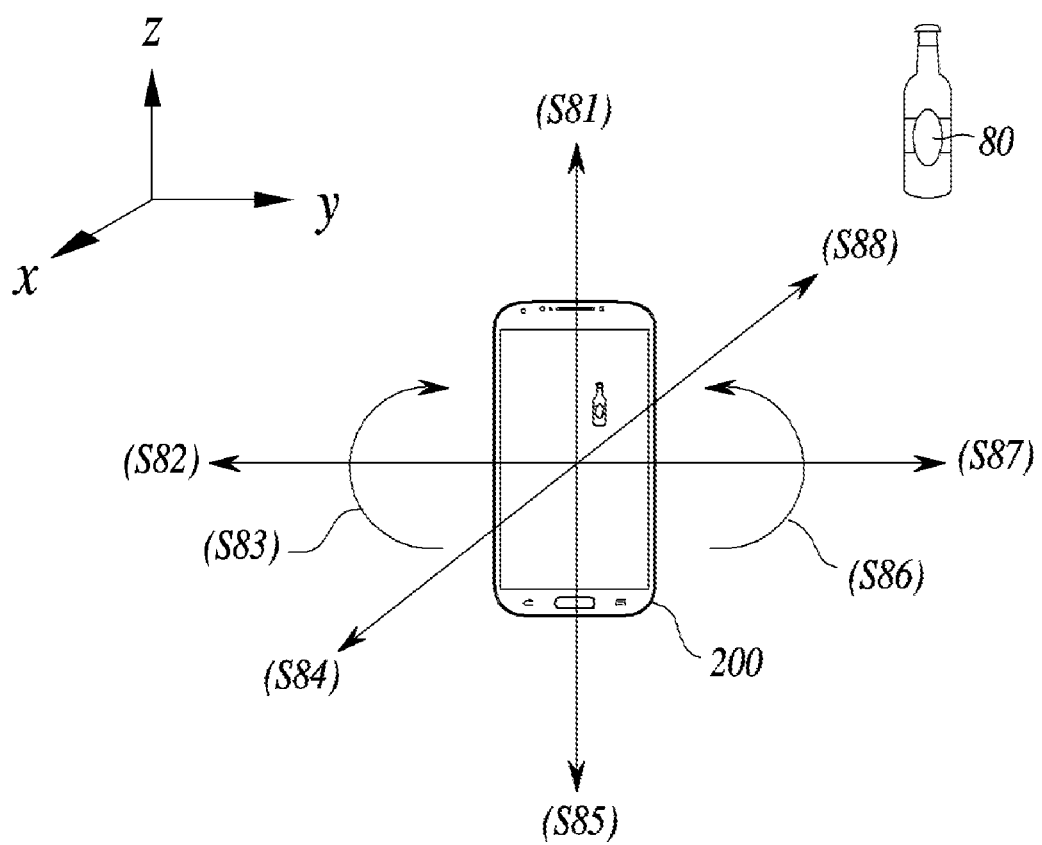
FIG. 8 is a diagram illustrating an output direction for device focus navigation according to an embodiment of the present disclosure.
Figure 9:
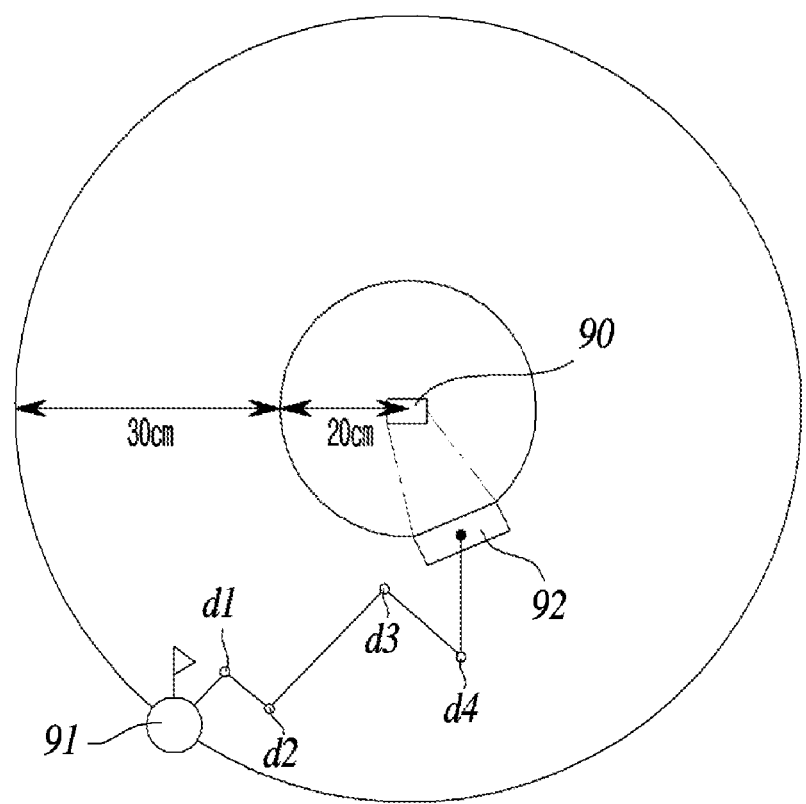
FIG. 9 is a diagram illustrating a scenario for device focus navigation according to an embodiment of the present disclosure.

FIG. 7 is a diagram illustrating a learning network for performing device focus navigation according to an embodiment of the present disclosure. FIG. 8 is a diagram illustrating an output direction for device focus navigation according to an embodiment of the present disclosure. FIG. 9 is a diagram illustrating a scenario for device focus navigation according to an embodiment of the present disclosure. A detailed algorithm for performing the device focus navigation will be described with reference to FIGS. 7 to 9.

The device focus navigation guides the mobile terminal to the optimum location for recognizing the purchase target item through an optimization algorithm such as reinforcement learning. Further, the device focus navigation uses an object detection algorithm and a navigation algorithm. Referring to FIG. 7, the egocentric video is input to the processor at step S71. Next, a feature is extracted from the egocentric video at step S73, and then Q-value approximation is performed at step S75. Then, the direction in which the mobile terminal needs to move is output at step S77.

Reinforcement learning used in an embodiment of the present disclosure will be described in detail.

According to an embodiment of the present disclosure, the device focus navigation instructs a series of appropriate actions to change the viewpoint so that a target object (for example, an item) is detected with a particular performance or more. To achieve this purpose, an agent of the reinforcement learning algorithm must act so that an expected value of the reward to be received in the future is maximized. The reinforcement learning is to find the policy that allows the agent to perform a series of actions which enable the purpose to be achieved. There is no state transition probability function and a reward function depends on data. That is, the problem to be solved in an embodiment of the present disclosure is defined as a reinforcement learning problem in a model-free state, and can be solved using Deep Q-learning.

Deep Q-Network is one of reinforcement learning methods. In the existing Q-learning, a Q-table is composed of calculated Q values, and the largest Q value is given to the state that the agent is in. However, in Deep Q-Network, the Q value is approximated using a deep artificial neural network. An image is received as an input through Deep Q-Network, and the action that the agent will perform is calculated in terms of probability and is output. The network used at this time is largely divided into two parts. The first part is a convolution network that receives an image and extracts a feature. The second part is a network that uses the extracted feature to operate as an approximation function of the Q function and outputs the Q value approximated for the action. The agent selects the action having the largest Q value among the Q values approximated through the learned network.

In order to perform object detection using reinforcement learning, object detection needs to be defined using a Markov decision problem. The Markov decision problem is defined by a total of four elements (S, A, P, R). S is a set of states. A is a set of actions that the agent can do P is a probability function for transition between states. R is a function for the reward that is received as feedback on transition from the existing state to another state when the agent performs an action. In the specification, the transition from one state to another state, that is, P is determined by not a state transition probability variable but the Q value, which is a result value of Deep Q-Network. A detailed definition will be described with reference to FIG. 8 as follows.

Definition of Action

The agent must make a decision at every point in time. This is referred to as an action in MDP. When the agent performs an action, the state of the agent in the environment is changed into a new state. As a result of the action, the agent is subjected to transition to a new state and receives a reward or a penalty accordingly. Many studies using DON have achieved great results in games, Go, and the like, but a different direction should be suggested for application to the real world. In the real world, a moving action is continuous, but in the specification, it is assumed that the action is discrete. A moving direction refers to direction information to find the viewpoint for detecting the target object well. The moving direction is a direction in which a camera moves when one action is performed. It is assumed that the pitch and the roll are almost unchanged when a person moves a mobile phone to shoot, so that collected information uses 4 DoF out of 6 DoF (Degrees of freedom). Therefore, in the specification, 4 DoF uses a total of four values as follows: x, y, and z coordinate of moving forward S88, backward S84, left S82, right S87, up S81, and down S85, and yaw values of clockwise rotation S83 and counterclockwise rotation S86 (see FIG. 8). A moving distance refers to a distance traveled in the moving direction when one action is performed. The moving distance is expressed with {short, middle, long}, and each length is defined by experiment. In the specification, the moving direction and the moving distance are provided to guide the user to move the camera to the optimum viewpoint. In MDP, the moving direction and the moving distance are defined as an action. In a process of detecting and recognizing a target object 80, in order to calculate the optimum location, the movement of the camera is measured every 0.5 cm, 1 cm, or 2 cm. With respect to the traveling direction, clockwise rotation is measured every +5°, +10°, or +15°, and counterclockwise rotation is measured every −5°, −10°, or −15°.

In an embodiment of the present disclosure, for the movement of the camera, actions A=($A_0A_1$) are collected as follows.

$A_d$={forward, backward, left, right, up, down, clockwise rotation, counterclockwise rotation}

A={short,middle,long}

$A_i$ is defined as follows on the basis of an accelerometer sensor value S of the Android phone.

$$\begin{cases} small & if\ 0 < S < \alpha, \\ middle & if\ 0 < S < \beta, \\ long & if\ \beta < S \end{cases}$$

α and β are determined by experiment.

A scenario of finding the optimum object detection viewpoint will be described with reference to FIG. 9 as follows.

When the camera is at a start point 91 and a target object is at a location 90, the device focus navigation according to an embodiment of the present disclosure performs guiding in the following order: {forward, short} (d1), {right, short} (d2), {forward, long} (d3), {right, middle} (d4), {counterclockwise at 100}, and {forward, middle}.

Figure 10:
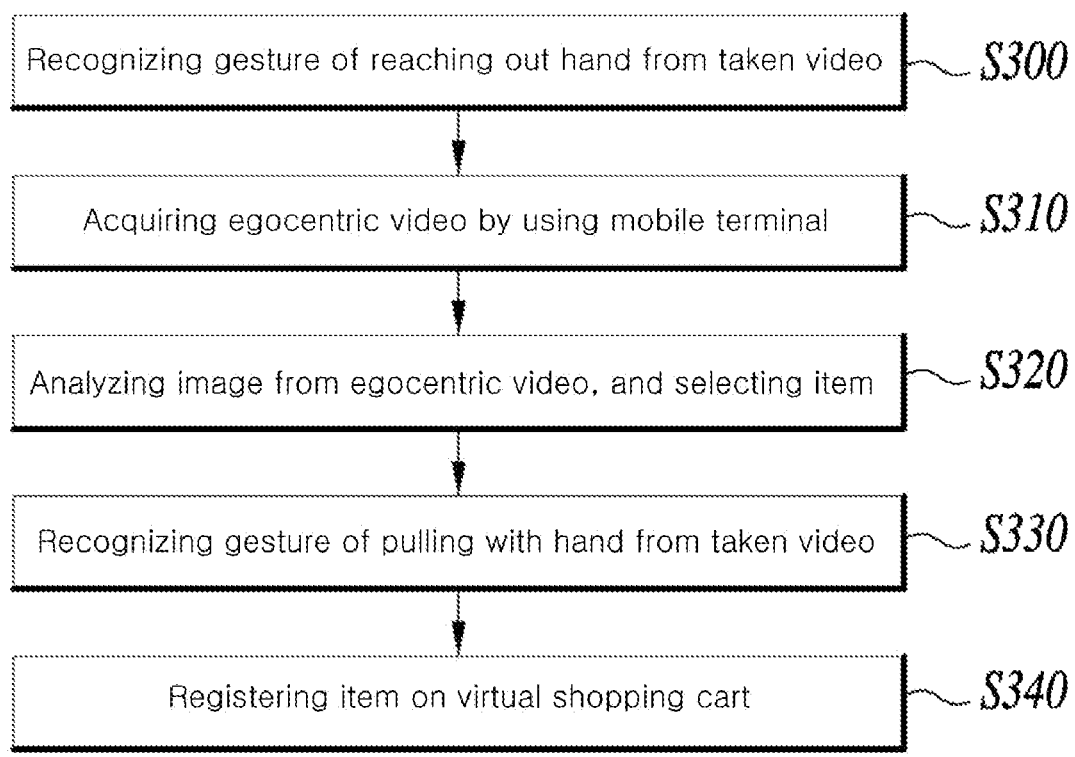
FIG. 10 is a flowchart illustrating a method of determining a purchase intention of a user according to an embodiment of the present disclosure.

FIG. 10 is a flowchart illustrating a method of determining a purchase intention of a user according to an embodiment of the present disclosure.

The method of determining the purchase intention of the user described in FIGS. 4 and 5 will be described with reference to FIG. 10.

A gesture of reaching out the hand is recognized from the video taken by the mobile terminal or by the fixed camera at step S300. Then, an egocentric video is acquired using the mobile terminal of the user at step S310. The processor detects a purchase target item by analyzing the image acquired from the egocentric video at step S320. When a gesture of pulling with the hand is recognized at step S330, the gesture is recognized as the purchase intention and the item is registered on the selected-item list at step S340.

Figure 11:
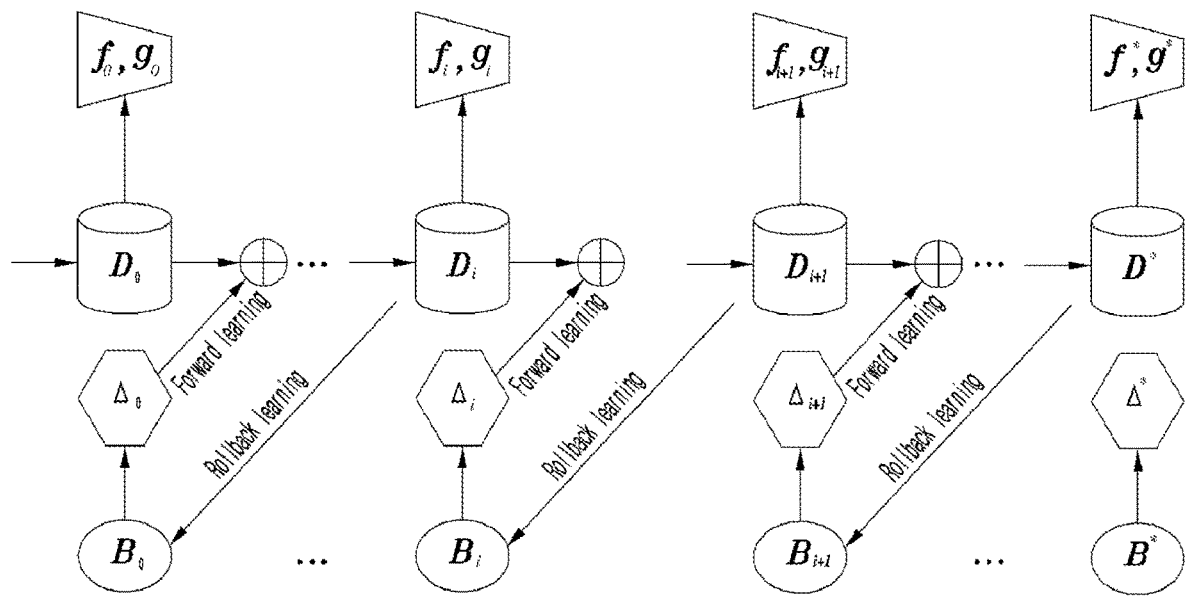
FIG. 11 is a conceptual diagram illustrating rapid adaptive learning for ensuring prediction with high reliability of device focus navigation according to an embodiment of the present disclosure.

FIG. 11 is a conceptual diagram illustrating rapid adaptive learning for ensuring prediction with high reliability of device focus navigation according to an embodiment of the present disclosure.

An actual label of an unlabeled data set cannot be known in advance, and thus a loss measurement function is defined and a new label is estimated. Considering both the worst case and the best case, a method of selecting an appropriate boundary of a current model may be developed. On the basis of this, an expected error is measured, an objective function for optimizing the learning efficiency is defined, and data minimizing the objective function may be selected. On the basis of this method, an ASSL algorithm may be extended, considering all unlabeled data when calculating the objective function. The retraining method of the existing deep learning model requires a lot of calculations because all unlabeled data and all possible labels are examined. To minimize this, a method of performing rapid adaptive ASSL learning based on a small bin will be proposed.

Figure 12:
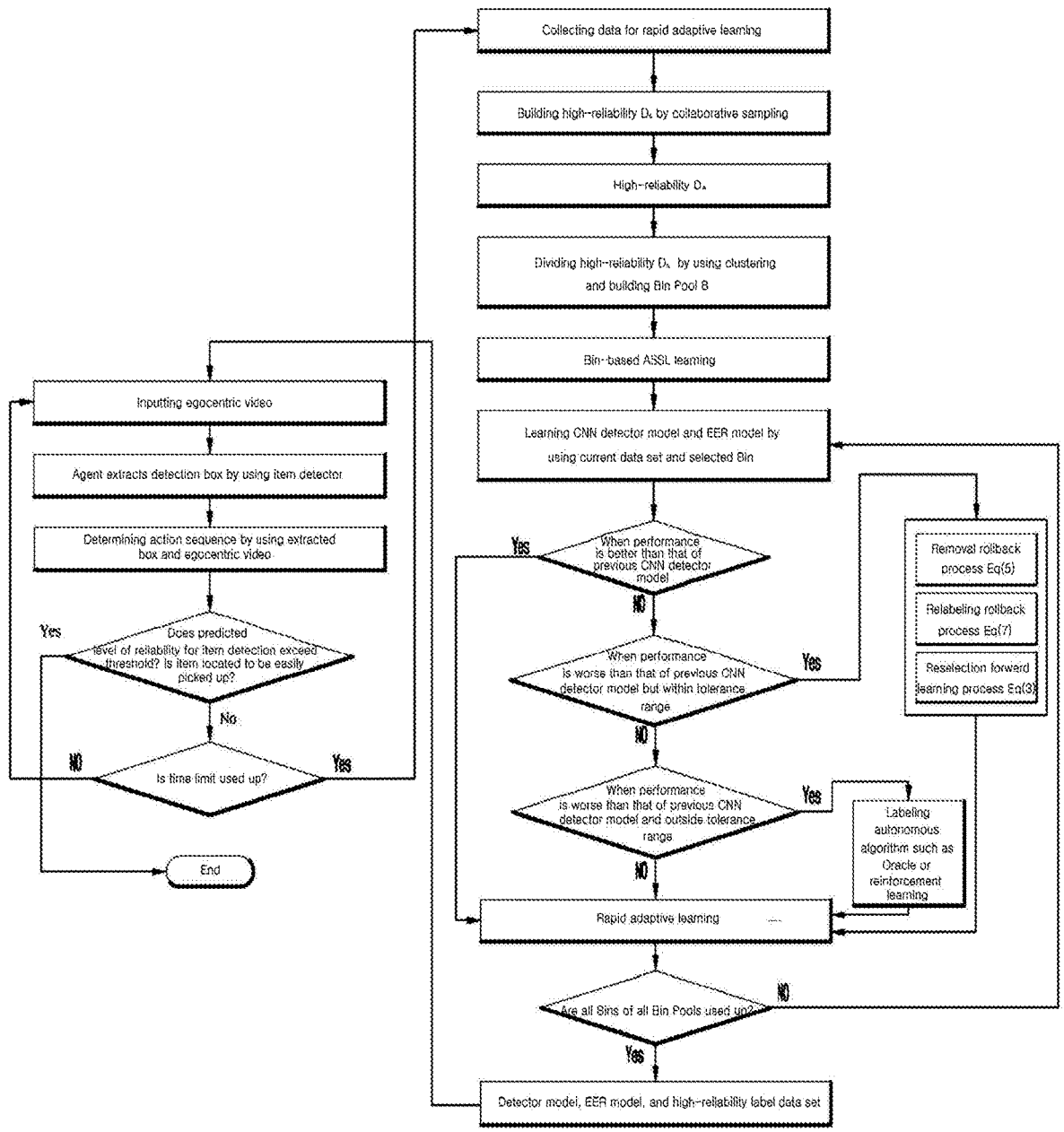
FIG. 12 is a flowchart illustrating a method of ensuring prediction with high reliability for device focus navigation according to an embodiment of the present disclosure.

FIG. 12 is a flowchart illustrating a method of ensuring prediction with high reliability for device focus navigation according to an embodiment of the present disclosure.

On the basis of the adaptive learning algorithm above described with reference to FIG. 11, in order to solve the uncertainty about the object classification problem, an object detector advances prediction of the reliability of item object detection that combines Forward Learning and Rollback Learning, breaking away from Forward Batch Learning that is commonly used. The object detector may use a collaborative filtering method and a rapid adaptive learning method.

In order to optimize the accuracy of the detector, collaborative filtering including uncertainty filtering, diversity filtering, and confidence filtering is applied to learning data as follows, thereby extracting data having more valid labels in terms of probability.

1. A step of determining uncertainty criteria and sampling data having great uncertainty is expressed as the following equation.

$$\hat{x}_l = \operatorname{argmax}_{x \in D_{imp}} - \sum_{i, x_i \in D_{imp}} p(y_i|x; \theta) \log P(y_i|x; \theta)$$

$$\hat{x}_l \in D_{uncertainty}$$

$D_{imp}$ denotes a full data set, and denotes a type of possible label.

2. A step of determining diversity criteria, calculating the Euclidean distance between features extracted from the data, and sampling data having the maximum diversity is expressed as the following equation.

$$D_{diversity} = \{X | X \in D_{uncertainty}, 0 \le f(X) \le 1\}$$

s.t. Rank(x)<η

Rank(x) denotes the descending order of f(x) and f(x) denotes the performance of the current CNN detector model for data x.

3. A step of determining confidence criteria and sampling only data having high reliability from the data is expressed as the following equation.

$$X_{top} = \operatorname*{argmax}_{x \in D_{diversity}} \left\{ \max_{x_i, x_j \in D_\Delta} d(x_i, x_j) \right\}$$

In order to apply the adaptive ASSL learning method, a step of collecting images of the purchase target item and of rapidly and adaptively learning a detector model by using the collected data is performed by combining an EER learning process and bin-based ASSL. A combined process includes: a rollback removal step of examining and removing suspicious data from labeled data; performing rollback bin-based ASSL through forward reselection-based learning or rollback relabeling-based learning. A technical content of the combined process is described below.

LD={$(x_i, y_i)$}$_{i=1}^{m}$ denotes a labeled learning data set, $U^{D=(x_i)i=m+1}^{n}$ denotes an unlabeled data set. Herein, m<<n. When the label of the selected sample x is y, addition to LD takes place and is denoted by $LD^+ = LD \cup (x, y)$. After collaborative sampling, $D_{div}$ denotes a current batch data set. $D_\Delta$ denotes a batch-based data set with high reliability of bin-based SSL. The size of $D_\Delta$ is limited to the reliability parameter y, and when that exceeds this, a reliability sample selection process is stopped. $D_\Delta$ is initialized with a sample that satisfies the following equation.

$x_{top} = \operatorname{argmax}_{x \in D_{div}} f(x)$, $x_{top} \in D_{div}$

The high-reliability sample strategy selects a sample from $D_{div}$, using the following measurement equation. By a distance measurement equation of the current Deep feature space, addition to $D_\Delta$ takes place.

$$x_{toy} = \mathrm{argmax}_{x \in D_{div}} \{\max_{x_i, x_j \in D_\Delta} d(x_i, x_j)\}$$

Herein, $d(x_i, x_j)$ denotes the Euclidean distance between two samples $x_i$ and $x_j$ in a deep feature space. The detector is retrained using a bin sequence generated from a high-reliability sample of The high-reliability sample is divided into bins and is defined as a bin pool $B(=\{B_j\}_{j \in B})$.

A detector model and an EER model are initialized as follows.

$g_{LD}$ denotes an EER model generated from LD, and $g_{LD^+}$ denotes an EER model generated from $LD^+$.

In ASSL, an unlabeled data sample pool is used at each learning step. For step i, expression is used as follows, considering bin $B_i$.

$$x'_{B_i} = \mathrm{argmin}_{x \in B_i} \qquad (2)$$
$$\sum_{y \in C} P(y|x; g_{LD}) \times \left(-\sum_{x' \in B_i, y' \in C} P(y'|x'; g_{LD^+}) \log(y', x', g_{LD^+})\right)$$

Herein, the first term represents label information of the current model, and the second term is the sum of expected entropy of the unlabeled data pool $B_i$ of the model $g_{LD^+}$.

After applying collaborative sampling, a pseudo-label set $\Delta_i = \{x_1, \ldots, x_u\}$ may be determined by repeatedly applying Equation (2) to a bin data set. However, in order to construct a model for each data sample of $B_i$, a lot of computation overheads are still required. Therefore, Equation (2) is approximated by constructing a model for selected samples of a pseudo-labeled set $\Delta_i$ as follows.

$$\Delta_i = \mathrm{argmin}_{\{x_1, \ldots, x_k\} \in B_i} \sum_{x_j \in B_i, y \in C} P(y|x; g_{LD}) \times \qquad (3)$$
$$\left(-\sum_{x' \in B_i, y' \in C} P(y'|x'; g_{LD^{+\Delta_i}}) \log(y', x', g_{LD^{+\Delta_i}})\right),$$

Herein, the first term represents label information of a current model for selected samples of a pseudo-labeled set $\Delta_i$, and the second term is the sum of expected entropy for unlabeled data $B_i$ of a weight model $g_{LD^{+\Delta_i}}$. Samples $\{x_1, \ldots, x_k\}$ having labels $\{y_1, \ldots, y_k\}$ are selected, and added to LD, which is expressed as $LD^{+\Delta_i} = LD \cup \{(x_1, y_1) \ldots, (x_k, y_k)\}$.

At each bin-based ASSL step, a reliability score is allocated to a pseudo sample by a current CNN detector. A labeled data $D_0$ is used to initialize a CNN detector model $f_0$ and an EER model $g_0$ at the beginning. $Acc_0$ is calculated by $f^0$ using valid data. By using $D_0 \cup B_j$ for each bin, the CNN detector model $\{f_0^{B_j}\}_{i=1}^J$ is created. $Acc_1$ represents $\{f_0^{B_j}\}_{i=1}^J$, that is, the maximum accuracy among bin scores calculated by $Acc_1$. That is, $Acc_1 = \max_{B_j}\{Acc_0^{B_j}\}$. When the performance is improved (that is $Acc_1 \geq Acc_0$), $D_1 = D_0 \cup B^0$ and $f_1 = f_0 B^0$ are performed and proceeding to the next step takes place. At the step, a CNN model $\{f_0^{B_j}\}_{i=1}^J$ is built for each bin by using $D_i | B_j$, and is updated with $Acc_{i+1} = \max_{B_j}\{Acc_i^{B_j}\}$. A step of adaptively learning a detector model is divided into the following three cases. Case 1) $Acc_{i+1} \geq Acc_i$, Case 2) $Acc_i - \tau < Acc_{i+1} < Acc_i$, and Case 3) $Acc_{i+1} \leq Acc_i - \tau$. Herein, Acc and $\tau$ are tolerance for exploration potential.

Case 1. For $Acc_{i+1} \geq Acc_i$, the best bin is selected for the next step, and an update is performed as follows. $D_{i+1} = D_i \cup B^+$ and $f_{i+1} = f_i B^*$; $B_i = B^*$; $B = B \setminus B_i$. Herein, the bin pool B is reduced by removing a selected bin.

Case 2. For $Acc_i - \tau < Acc_{i+1}$, the following is performed.

1) A rollback learning processor finds a sample to be removed from $\Delta_i$ by using the equation below.

A rollback sample for removal is selected only from a bin of the last pseudo-labeled sample by using a classification model as follows.

$$R_\Delta^{remov} = \mathrm{argmin}_{\{x_1, \ldots, x_r\} \in \Delta_i} \sum_{x_i \in R_\Delta^{remov}, y \in C} P(y|x; g_{LD \setminus R_\Delta^{remov}}) \times \qquad (5)$$
$$\left(-\sum_{x' \in \Delta_i, y' \in C} P(y'|x'; g_{LD \setminus R_\Delta^{remov}}) \log(y', x', g_{LD \setminus R_\Delta^{remov}})\right)$$

Herein, $R_\Delta^{remov}$ denotes a rollback sample to be removed in a reselection process. When the selected rollback samples are $\{x_1, \ldots, x_r\}$ that are pseudo-labeled with $\{y_1, \ldots, y_r\}$, respectively, and are removed from LD, the samples are expressed as a difference set $LD \setminus T_\Delta = LD\{(x_1, y_1) \ldots, (x_r, y_r)\}$.

2) A relabeling sample is found, and a new label is allocated in $\Delta_i$ by using a rollback learning process based on Equation (7).

In the calculation of a model for each relabeled candidate, considering computation overhead, in terms of a relabeled candidate pool in $\Delta_i$, a relabel rollback learning process is performed as follows.

$$R_\Delta^{relab} = \mathrm{argmin}_{\{x_1, \ldots, x_r\} \in \Delta_i} \frac{1}{Z} \sum_{y_i \in C, i \notin R_\Delta^{relab}} P(y_i|x; g_{LD \setminus R_\Delta^{relab}}) \times \qquad (7)$$
$$\left(-\sum_{x' \in \Delta_i, y' \in C} P(y'|x'; g_{LD|(x, y_i)}) \log(y', x', g_{LD|(x, y_i)})\right)$$

Herein, $LD|(x, y_i)$ means that y is allocated to a similar label x. Z denotes a normalization constant and is calculated as follows.

$$Z = \sum_{i \notin R_\Delta^{relab}, y_i \in C} P(y_i|x; g_{LD \setminus R_\Delta^{relab}}) = 1 - P(y_i^\dagger|x; g_{LD \setminus R_\Delta^{relab}})$$

Herein, $y_i^\dagger \in R_\Delta^{relab}$.

3) By using an EER forward learning process on the basis of Equation (3), $\Delta_i$ is updated by reselection.

In Case 3, Oracle labels incorrectly labeled data of $B^*$, and a model is updated according to the following equation.

$$f_{i+1} = f_i f_{i+1} + g_i D_{i+1}.$$

A rollback process of Case 2 may significantly reduce the Oracle labeling step. $(D_i \cup \Delta_i)$ is used in creating a learning data set $D_{i+1}$ that is used to learn $f_{i+1}$ and $g_{i+1}$ at time t. This process is repeated until convergence.

Last, rollback bin-based SSL creates two types of models f and g, and an extended labeled data set LD. The combination of EER-based rollback learning and bin-based SSL creates an object detector that is rapid and adaptive even for noisy streaming samples in a dynamically changing environment.

The forward-rollback learning process is repeated until $Acc_{i+1} \geq Acc_i$, $Acc_{i+1} \leq Acc_i - \tau$, or the limited time. When the condition $Acc_{i+1} \geq Acc_i$ is satisfied, updates are performed as follows $D_{i+1}=D_i \cup \Delta_j$, $f_{i+1}=f_i^{\Delta j}$, $g_{i+1}=g_i^{\Delta j}$, and $B=B \backslash B_i$.

In the meantime, the in-store automatic payment method and system according to an embodiment of the present disclosure may be applied to unmanned stores/convenience stores, but are not limited thereto. The method and the system may also be applied to service products, such as food courts, cafes, restaurants, beauty salons, indoor game rooms, and the like.

In addition, in the case where the places where the products are provided are distributed, the times of automatic payment may be set to be one time, the time that the user wants, or more than one time at a particular position.

The above description is merely intended to exemplarily describe the technical idea of the present disclosure, and those skilled in the art will appreciate that various changes and modifications are possible without departing from the essential features of the present disclosure. Therefore, the embodiments disclosed in the present disclosure are not intended to restrict the technical idea of the present disclosure and are merely intended to describe the present disclosure, and the technical idea of the present disclosure is not limited by those embodiments. The scope of the present disclosure should be defined by the accompanying claims, and the technical idea of all equivalents thereof should be construed as being included in the scope of the present disclosure.

DESCRIPTION OF THE REFERENCE NUMERALS IN THE DRAWINGS

100: Central server
200: Mobile terminal
300: Fixed camera
1000: In-store automatic payment system

The invention claimed is:

1. An in-store automatic payment method, the method comprising
    providing, by a processor of a central server through a communication module to a mobile terminal of a user, an in-store travel map including a travel path to a destination in a store where a purchase target item that the user wants to purchase is located, the travel map being provided at least one of visually in a display of the mobile terminal, or in a form generated by the mobile terminal that is recognizable by a visually impaired person;
    acquiring, by the processor of the central server through an input module, in-store images of the store through one or more fixed cameras installed in the store, and detecting, by the processor of the central server, an obstacle from the in-store images;
    notifying, by the processor of the central server, of the obstacle to the mobile terminal of the user through the communication module whether the obstacle is on the travel path;
    collecting, by a camera of the mobile terminal of the user, an egocentric video corresponding to the travel path;
    detecting, by the processor of the central server or a processor of the mobile terminal of the user, the purchase target item from the egocentric video acquired through the camera of the mobile terminal of the user;
    calculating, by the processor of the central server or the processor of the mobile terminal of the user, a level of reliability for the purchase target item from the egocentric video using a predetermined algorithm installed in the central server or the mobile terminal of the user; and
    registering, by the processor of the central server or the processor of the mobile terminal of the user, the purchase target item on a selected-item list of the user when the level of reliability is equal to or greater than a preset threshold, the selected-item list identifying one or more items to be automatically purchased;
    wherein the calculating of the level of reliability for the purchase target item from the egocentric video comprises:
    providing, by the processor of the central server, device focus navigation to the mobile terminal so that the mobile terminal moves to a location where the level of reliability becomes optimized.

2. An in-store automatic payment method, the method comprising:
    recognizing, by a central server through a communication module, a unique identifier (ID) of a user stored in a memory of a mobile terminal of the user when the user enters a store;
    obtaining, by a process of the central server, information on a purchase target item which the user of the ID wishes to purchase;
    providing, by the processor of the central server, an indoor map of the store and first location information of the purchase target item to the mobile terminal though the communication module, the indoor map being displayed on a screen of the mobile terminal;
    providing, by the processor of the central server though the communication module, indoor navigation to the mobile terminal of the user to inform the user of a travel path to the purchase target item;
    acquiring, by the processor of the central server through an input module, in-store images of the store through one or more fixed cameras installed in the store, and detecting, by the processor of the central server, an obstacle from the in-store images;
    notifying, by the processor of the central server, of the obstacle to the mobile terminal of the user through the communication module whether the obstacle is on the travel path;
    collecting, by a camera of the mobile terminal of the user, an egocentric video corresponding to the travel path;
    detecting, by the processor of the central server or a processor of the mobile terminal of the user, the purchase target item from the egocentric video acquired through the camera of the mobile terminal of the user;
    calculating, by the processor of the central server or the processor of the mobile terminal of the user, a level of reliability for the purchase target item from the egocentric video using a predetermined algorithm installed in the central server or the mobile terminal of the user; and
    registering, by the processor of the central server or the processor of the mobile terminal of the user, the purchase target item on a selected-item list when the level of reliability exceeds a preset threshold, the selected-item list identifying one or more items to be automatically purchased;
    wherein the calculating of the level of reliability for the purchase target item from the egocentric video comprises:
    providing, by the processor of the central server, device focus navigation to the mobile terminal so that the mobile terminal moves to a location where the level of reliability becomes optimized.

3. The method of claim 1, further comprising:
tracking, by the processor of the central server, a position of the user's hand from the egocentric video and determining whether the position of the user's hand is a preset position,
wherein when the position of the user's hand is the preset position, the purchase target item is registered on the selected-item list, and
the preset position is a distance where the user's hand easily picks up the purchase target item.

4. The method of claim 1, further comprising:
determining, by the processor of the central server, a purchase intention of the user by using the egocentric video,
wherein at the determining of the purchase intention of the user, the determining is performed by recognizing, from the egocentric video, at least one of a gesture or state of the user.

5. The method of claim 1, wherein the device focus navigation displays an optimum location of the purchase target item on the mobile terminal for recognizing the purchase target item through reinforcement learning.

6. The method of claim 1, wherein the calculating of the level of reliability comprises:
applying a collaborative filtering method and a rapid adaptive learning method of an object detector, thereby increasing reliability of object detection for the purchase target item.

7. The method of claim 1, wherein the providing of the device focus navigation comprises:
receiving or calculating, by the processor of the central server or the processor of the mobile terminal, third location information of the mobile terminal on the basis of second location information of an item detected from the egocentric video; and
providing, by the processor of the central server or the processor of the mobile terminal, the device focus navigation to the mobile terminal by comparing the third location information of the mobile terminal and the second location information of the item.

8. The method of claim 1, wherein the device focus navigation is performed through an object detection algorithm and a reinforcement learning algorithm.

9. The method of claim 2, further comprising:
tracking, by the processor of the central server, a position of the user's hand from the egocentric video and determining whether the position of the user's hand is a preset position,
wherein when the position of the user's hand is the preset position, the purchase target item is registered on the selected-item list, and
the preset position is a distance where the user's hand easily picks up the purchase target item.

10. The method of claim 2, further comprising:
determining, by the processor of the central server, a purchase intention of the user by using the egocentric video,
wherein at the determining of the purchase intention of the user, the determining is performed by recognizing, from the egocentric video, at least one of a gesture or state of the user.

11. The method of claim 2, wherein the calculating of the level of reliability comprises:
applying a collaborative filtering method and a rapid adaptive learning method of an object detector, thereby increasing reliability of object detection for the purchase target item.

* * * * *